Dec. 10, 1929.  J. J. FELSENFELD  1,738,767
BRACELET CLASP FOR WRIST WATCHES
Filed March 13, 1926

INVENTOR
JACK J. FELSENFELD
BY
ATTORNEY

Patented Dec. 10, 1929

1,738,767

UNITED STATES PATENT OFFICE

JACK J. FELSENFELD, OF BROOKLYN, NEW YORK

BRACELET CLASP FOR WRIST WATCHES

Application filed March 13, 1926. Serial No. 94,544.

This invention relates to clasps. The object of the invention is to improve the securing of a wrist-watch about the wrist of the wearer through the medium of strings of beads. In carrying out the object of the invention it is purposed that the strings of beads be secured by knotting at their ends with the knots substantially concealed but accessible. A further object of the invention is to form the clasps in such a way that their attachment to the bales of the watch is substantially permanent and strong but at the same time detachable.

The above and further objects of the invention will better be understood by reference to the illustrative embodiment of the invention described in the following specification in connection with the accompanying drawings which form a part hereof. It is to this illustrative embodiment that the claim is directed solely for purposes of illustration and not limitation.

Figure 1:
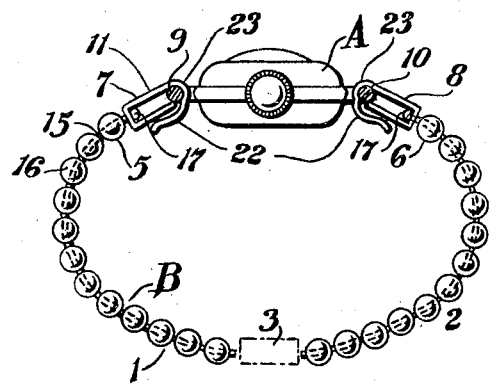
Fig. 1 is a plan view of a wrist-watch attached to a bracelet of strings of beads in accordance with my invention.

The wrist-watch A is arranged for securing about the wrist of the wearer by means of a bracelet B of strings of beads such as pearls or substitute pearls, and is preferably in two parts, 1 and 2, readily detachably securable by any approved form of buckle or clasp 3. The terminal ends 5 and 6 of the strings of beads are permanently anchored to a pair of clasps 7 and 8 attached to swivel upon the bales 9 and 10 of the watch A.

Each clasp 7 and 8 comprises an outer wall 11 preferably parallel to and spaced apart from an inner wall 12. These walls are cross-connected by a web 13 having perforations 14, one for each string 15, functioning to string the beads 16. Knots 17 concealed between the two walls 11 and 12 but accessible through the open sides 18 and 19 is the preferred form of anchorage for the strings of beads.

The outer end of the chamber between the walls 11 and 12 is partially closed by an inturned lip 20 preferably shaped to contact over a relatively large area with one of the bales 9 or 10, but is so limited as to leave a slot-like opening 21 almost but not quite large enough to permit the passage therethrough of one of the bales 9 or 10. Extending inwardly and over the wall 12 is a locking hook-shaped portion 22 which preferably extends out integrally from the lip 20 but is of weakened construction as may be accomplished by cutting out the inner portion thereof as indicated by the cut-out 23. There is enough resilience between the lip 24 of the clasp and the wall 11 to permit insertion and removal of a bale 9 and this resilience tends to keep the bale and clasp locked together, but reliance upon this alone is insufficient. When the clasp is attached to a bale, it is preferred that the hook portion 22 be bent down towards or against the inner wall 12 so that substantially a permanent block for all purposes and use is accomplished, although this weakened hook portion may readily be bent out by a jeweler to remove the watch from the bracelet. This bending of the hook portion 22 into a permanent position to rest against the wall 12, not only closes the exit place for the bales of the watch, but prevents the resilient spreading out or apart of the walls 11 and 12. It should be noted that it is preferred that the lip 20 itself form an incomplete hook but that it hook over and beyond the diameter of a bale 9 so that it is itself strong in resisting any tension stressed in the bracelet which would be transmitted to the clasp from the bale of the watch.

Figure 2:
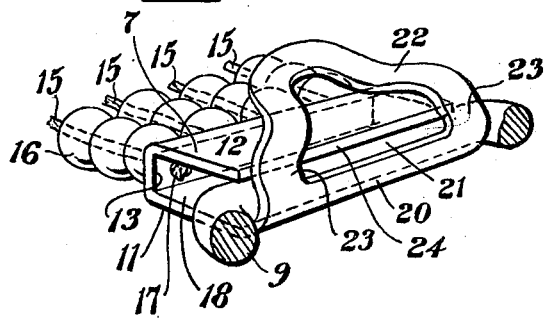
Fig. 2 is a perspective view drawn to an enlarged scale showing the clasp construction.
Figure 3:
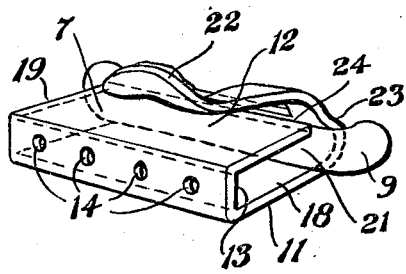
Fig. 3 is another perspective view of the clasp construction.
Figure 4:
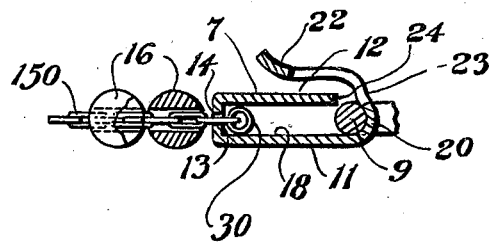
Fig. 4 is a cross-section through the clasp and bale.

In Fig. 4 I have shown a modification in which instead of silk cords for attaching the strands of pearls as indicated for Figs. 1 and 2, I employ a fine chain 150 which strings the beads 16, passes through the perforations 14 and are locked within the clasp preferably by means of a round link 30 too large to pass through a perforation 14.

The inventive thought may have a variety of expressions as is contemplated in what I claim and desire to secure by United States Letters Patent as follows:

A clasp of sheet metal comprising spaced inner and outer walls; a cross-connecting web for said walls having perforations to permit the insertion of bead strings and form an anchorage for the knotted ends thereof in concealed position; said outer wall having an inturned unyielding gripping lip; and a non-resiliently bendable blocking portion of weaker construction than said lip and integral with said unyielding lip and extending inwardly and over said inner wall; and said inner and outer walls at their free ends being relatively resiliently bendable and subject to reinforcement against separable bending by a non-resilient bending of said portion of weakened construction.

JACK J. FELSENFELD.